(12) United States Patent
Kanagawa et al.

(10) Patent No.: US 8,348,351 B2
(45) Date of Patent: Jan. 8, 2013

(54) BRAKE CONTROL DEVICE

(75) Inventors: Akiharu Kanagawa, Saitama (JP); Yasushi Aoki, Saitama (JP); Makoto Kikuchi, Nagano (JP)

(73) Assignees: Honda Motor Co., Ltd., Tokyo (JP); Nissin Kogyo Co., Ltd., Nagano (JP)

( * ) Notice: Subject to any disclaimer, the term of this patent is extended or adjusted under 35 U.S.C. 154(b) by 1431 days.

(21) Appl. No.: 11/360,319

(22) Filed: Feb. 23, 2006

(65) Prior Publication Data
US 2006/0197373 A1  Sep. 7, 2006

(30) Foreign Application Priority Data

Mar. 4, 2005  (JP) .................................. 2005-061183
Mar. 31, 2005  (JP) .................................. 2005-105134

(51) Int. Cl.
*B60T 8/44* (2006.01)
(52) U.S. Cl. ................ 303/114.1; 303/9.63; 303/122.09
(58) Field of Classification Search .................. 303/9.63, 303/9.75, 11, 122.08, 122.09, 114.1, 116.1
See application file for complete search history.

(56) References Cited

U.S. PATENT DOCUMENTS

| | | | | |
|---|---|---|---|---|
| 5,716,108 A | * | 2/1998 | Asa et al. .......................... 303/3 |
| 6,454,364 B1 | * | 9/2002 | Niwa et al. ...................... 303/152 |
| 6,641,233 B2 | * | 11/2003 | Kusano et al. ................. 303/152 |
| 6,957,871 B2 | | 10/2005 | Maki |
| 7,309,112 B2 | | 12/2007 | Isono |
| 2006/0158026 A1 | * | 7/2006 | Aoki et al. ................. 303/114.1 |

FOREIGN PATENT DOCUMENTS

| | | |
|---|---|---|
| DE | 103 56 085 A1 | 7/2004 |
| EP | 1 151 901 A1 | 11/2001 |
| JP | 2002-019592 | 1/2002 |
| JP | 2002-264795 | 9/2002 |

* cited by examiner

*Primary Examiner* — Xuan Lan Nguyen
(74) *Attorney, Agent, or Firm* — Carrier Blackman & Associates, P.C.; Joseph P. Carrier; William D. Blackman (57) ABSTRACT

A brake control device is provided, which is capable of providing a precise diagnosis on a trouble on a hydraulic pressure valve etc., so as to provide an appropriate output hydraulic pressure corresponding to a stroke amount of a brake pedal. In this device, an electromagnetic valve is provided on a hydraulic pressure passage allowing an auxiliary hydraulic pressure chamber to communicate with an accumulator, and is controlled to open when such a trouble occurs that output hydraulic pressure from the hydraulic pressure valve becomes lower than a predetermined range; and an electromagnetic valve is also provided on a hydraulic pressure passage allowing the auxiliary hydraulic pressure chamber to communicate with a reservoir, and is controlled to open when such a trouble occurs that the output hydraulic pressure from the hydraulic pressure valve becomes insufficiently reduced.

5 Claims, 4 Drawing Sheets

BRAKE CONTROL DEVICE

CROSS-REFERENCE TO RELATED APPLICATIONS

This application claims the benefit of Japanese Patent Applications 2005-061183 filed on Mar. 4, 2005 and 2005-105134 filed on Mar. 31, 2005, the disclosures of which are incorporated herein by reference.

BACKGROUND OF THE INVENTION

1. Field of the Invention

The present invention relates to a brake control device, particularly to a brake control device for controlling a hydraulic brake.

2. Description of the Related Art

A conventional hydraulic brake device, as disclosed in JP-A-2002-264795, includes a hydraulic pressure source for accumulating working fluid pressure, a pressure governing valve for regulating and outputting the hydraulic pressure supplied from the hydraulic pressure source corresponding to the push-force on a brake pedal, a master cylinder that is operated by the hydraulic pressure supplied from the pressure governing valve into an auxiliary hydraulic pressure chamber, thereby generating and outputting the hydraulic pressure according to the hydraulic pressure of the auxiliary hydraulic pressure chamber, and wheel cylinders that are operated by the hydraulic pressure output form the master cylinder, whereby applying brake force to wheels of a vehicle.

Accordingly, the hydraulic pressure regulated by the pressure governing valve can provide a large brake force with a small footing-force on a brake pedal. In the conventional hydraulic brake, regenerative cooperative control switching valves are used when performing regenerative cooperative control, and the wheel cylinders communicate with the pressure governing valve or with a reservoir so as to regulate the hydraulic pressure in the wheel cylinders at an appropriate pressure.

However, in the hydraulic brake device as disclosed in JP-A-2002-264795, the hydraulic pressure output from the pressure governing valve to the auxiliary hydraulic pressure chamber decreases below a predetermined range when performing a brake action, if such a trouble occurs that a foreign substance clogged in a hydraulic pressure path on the output side of the pressure governing valve. This hinders the hydraulic pressure from being outputted in an amount corresponding to the pedal stroke amount. Consequently, in the event of such trouble, a sufficient hydraulic pressure cannot be output from the pressure governing valve to the master cylinder side.

There may also occur another trouble that a valve spool pushed into the output hydraulic pressure chamber against force of springs, by actuating the brake pedal, does not return properly even after easing the pedal because the spring is caught on the circumferential surface of the output hydraulic pressure chamber. This prevents providing an output hydraulic pressure corresponding to the brake pedal stroke amount. Consequently, a properly reduced output hydraulic pressure to be output to the master cylinder side cannot be provided.

Therefore, in order to overcome the above mentioned disadvantages, when a trouble occurs at the pressure governing valve or the like, accurate detection of the trouble and diagnosis of its situations are required so as to provide a proper action against it.

Taking the above mentioned disadvantages into account, an object of the present invention is to provide a brake control device capable of performing an accurate diagnosis on situations of the trouble on a pressure governing valve or switching valves, so as to output an appropriate output hydraulic pressure corresponding to a brake pedal stroke amount even if a trouble occurs on the pressure governing valve or the switching valves.

SUMMARY OF THE INVENTION

According to a first aspect of the present invention, a brake control device comprises:

a hydraulic pressure source comprising a pump for pumping working fluid from a reservoir and an accumulator for accumulating the working fluid pumped by the pump;

a pressure governing valve for regulating and outputting hydraulic pressure supplied from the accumulator corresponding to a stroke amount of a brake operating member;

wheel cylinders operated by the output hydraulic pressure outputted from the pressure governing valve;

a valve that is normally closed and provided on a hydraulic pressure passage that allows an accumulator side to communicate with the wheel cylinders, via a hydraulic pressure input side of the pressure governing valve;

a hydraulic pressure sensor for detecting a value of the hydraulic pressure supplied from the accumulator into the pressure governing valve;

an output hydraulic pressure sensor for detecting a value of the output hydraulic pressure outputted from a hydraulic pressure output side of the pressure governing valve into the wheel cylinders;

a stroke amount detecting part for detecting a stroke amount of the brake operating member; and a control unit for controlling the valve to open and close, depending on information on each value detected from the hydraulic pressure sensor, the output hydraulic pressure sensor and the stroke amount detecting part, wherein the control unit controls the valve normally closed to open so as to output the hydraulic pressure outputted from the accumulator side via the hydraulic pressure input side of the pressure governing valve into the wheel cylinders when determining that a trouble has occurred on the pressure governing valve, wherein the control unit determines the trouble on the pressure governing valve if determining that:

the hydraulic pressure within an appropriate range is outputted from the accumulator to the hydraulic pressure input side of the pressure governing valve, based on information on the detected value inputted from the hydraulic pressure sensor;

a valve of output hydraulic pressure outputted from the hydraulic pressure output side of the pressure governing valve at a time of a braking operation by the brake operating member is lower than a reference output pressure depending on information on the stroke amount of the braking operation inputted from the stroke amount detecting part, based on information on the detected value inputted from the output hydraulic pressure sensor; and a difference between the value of the output hydraulic pressure and the reference output pressure is greater than a predetermined value.

According to a second aspect of the present invention, a brake control device comprises:

a hydraulic pressure source comprising a pump for pumping working fluid from a reservoir and an accumulator for accumulating the working fluid pumped by the pump;

a pressure governing valve for regulating hydraulic pressure supplied from the accumulator corresponding to a stroke amount of a brake operating member;

and wheel cylinders operated by output hydraulic pressure outputted from the pressure governing valve;

an automated brake control switching valve unit at least capable of switching a current state to a state in which the wheel cylinders communicates with the pressure governing valve, and are shut-off from the accumulator; and capable of switching a current state to a state in which the wheel cylinders communicates with the accumulator, and are shut-off from the pressure governing valve;

a hydraulic pressure sensor for detecting a value of the hydraulic pressure supplied from the accumulator into the pressure governing valve;

a first output hydraulic pressure sensor for detecting a value of the output hydraulic pressure outputted from the hydraulic pressure output side of the pressure governing valve;

a second output hydraulic pressure sensor for detecting a value of a hydraulic pressure operating the wheel cylinders;

a stroke amount detecting part for detecting a stroke amount of the brake operating member; and a control unit comprising:

a reference pressure deciding part for deciding a predetermined reference output pressure depending on a stroke amount detected by the stroke amount detecting part; and a trouble determining part for determining a trouble in the light of a correlation of a detected value of the first output hydraulic pressure sensor, a detected value of the second output hydraulic pressure sensor and the reference output pressure decided by the reference pressure deciding part.

Other aspect, features and advantages of the present invention will become apparent upon reading the following specification and claims when taken in conjunction with the accompanying drawings.

DETAILED DESCRIPTION OF PREFERRED EMBODIMENT

Embodiments of the present invention will be described hereinafter with reference to FIGS. 1 to 4.

Figure 1:
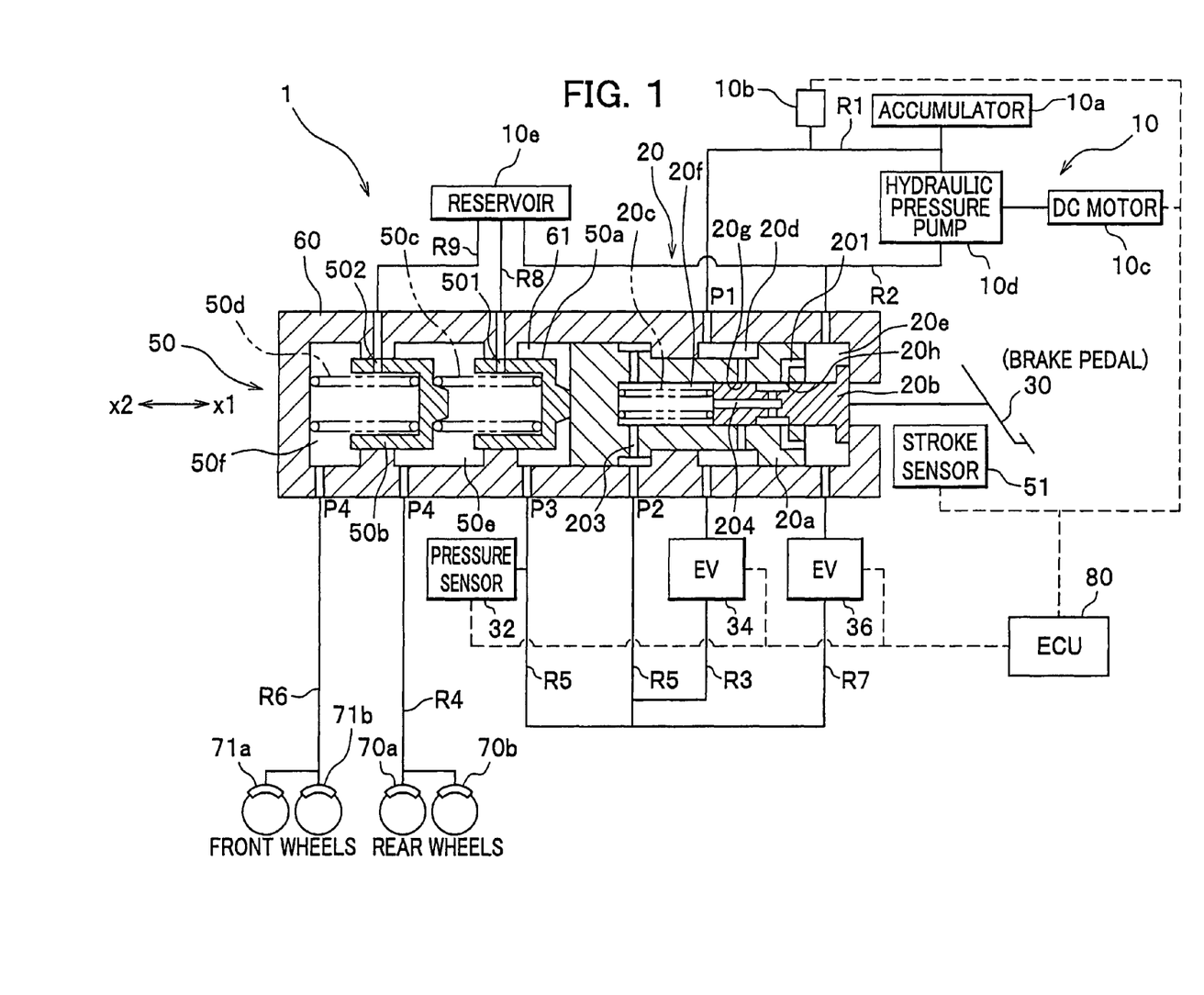
FIG. 1 is a block diagram of a brake control device according to the first embodiment of the present invention.
Figure 2:
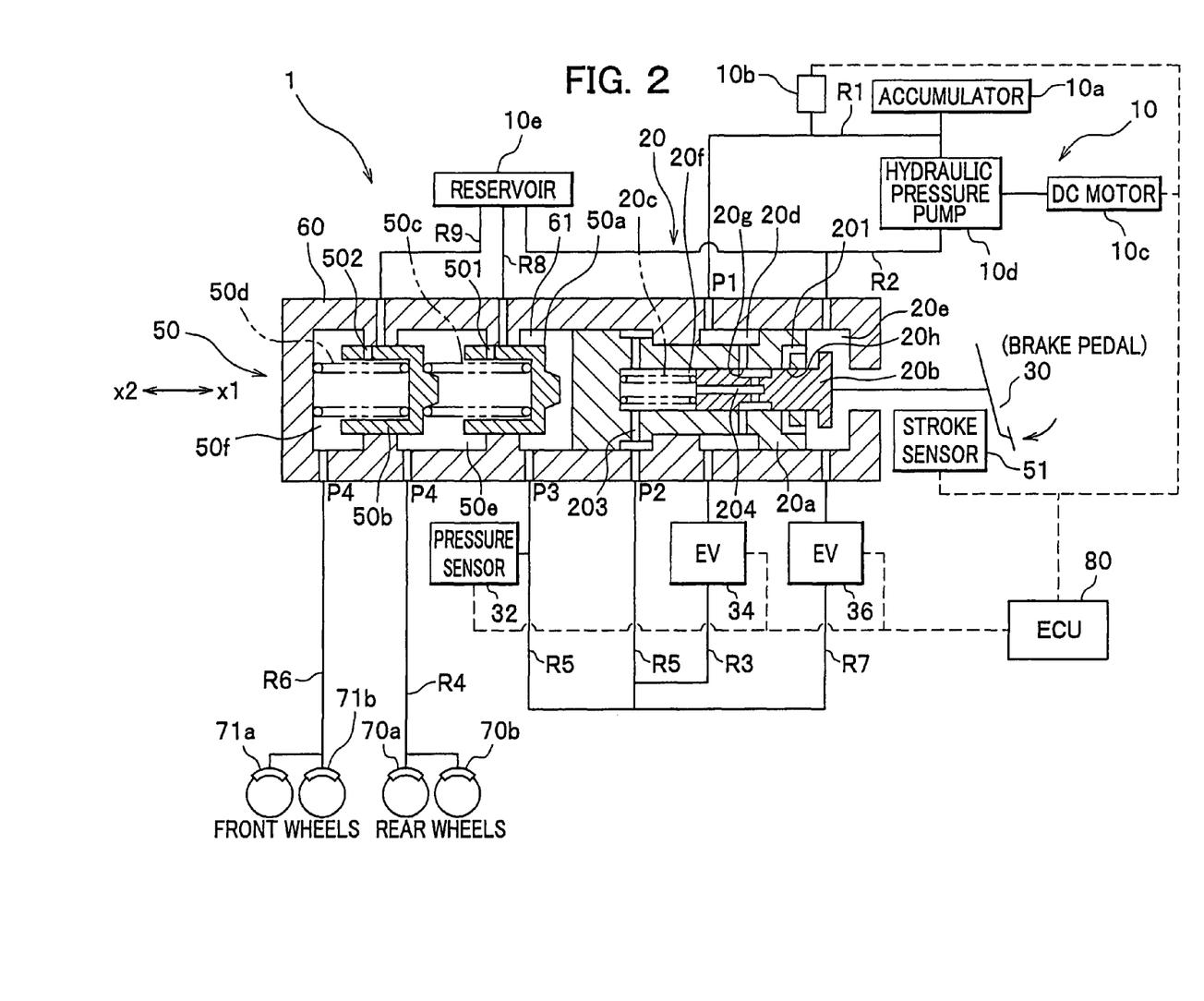
FIG. 2 is a block diagram showing the brake control device according to the first embodiment of the present invention when a brake pedal is actuated.
Figure 3:
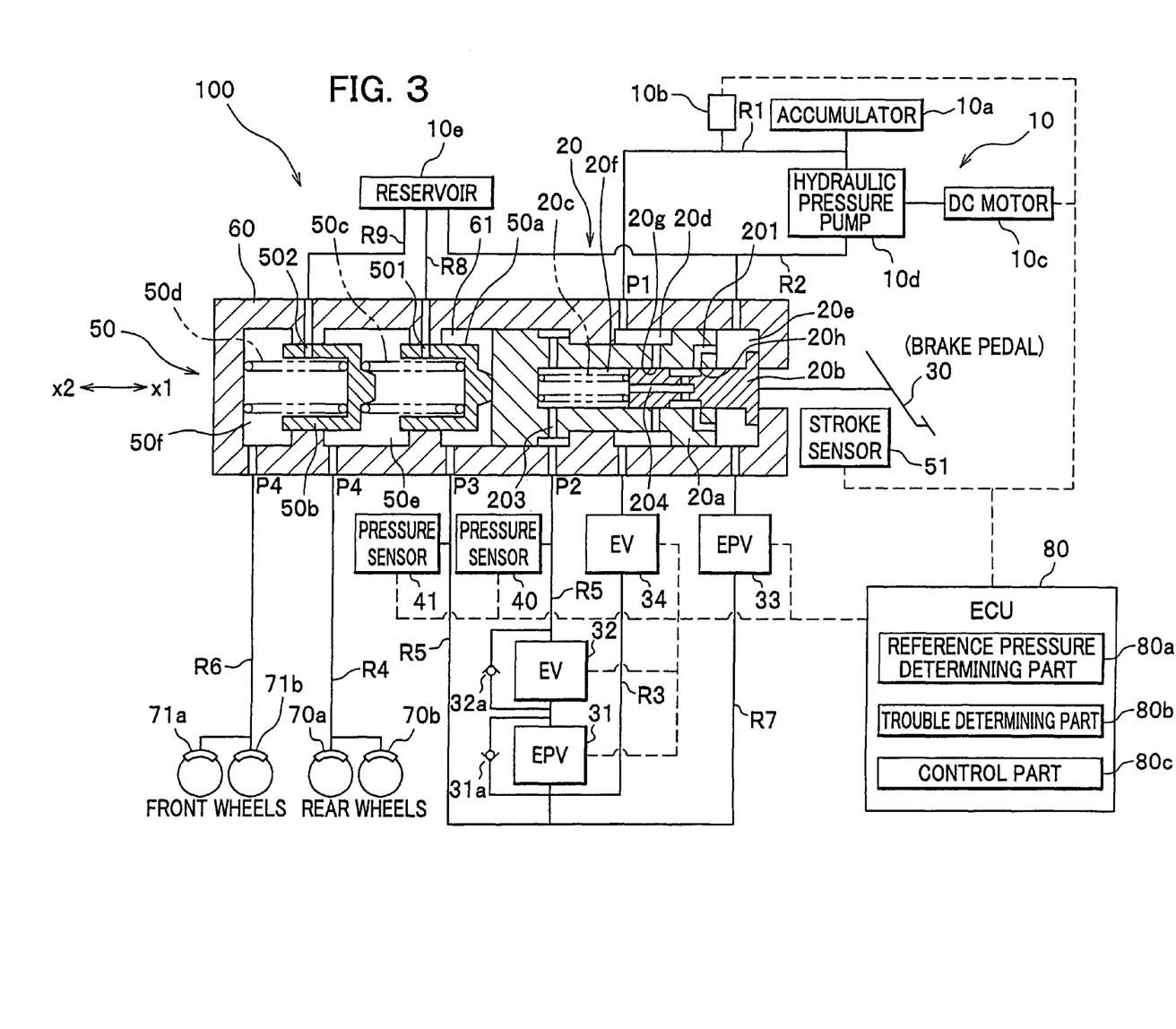
FIG. 3 is a block diagram of a brake control device according to the second embodiment of the present invention.

FIGS. 1 to 3 are block diagrams showing brake control devices according to the embodiments of the present invention. Each drawing illustrates an outline of each brake control device including a cross-sectional view of a hydraulic booster equipped with a motor vehicle. Note that the same components of the second embodiment as those of the first embodiment are denoted by the same numeral references of the first embodiment.

First Embodiment

A brake control device 1 principally comprises a hydraulic pressure source 10, a pressure governing valve 20, an auxiliary hydraulic pressure chamber 61, a master cylinder 50, wheel cylinders 70a, 70b, 71a, 71b and an ECU (Electronic Control Unit) 80.

With reference to FIG. 1, a detailed description will be given on each component of the brake control device 1 hereinafter.

<Components>

The hydraulic pressure source 10 generates working fluid for wheel braking at a predetermined hydraulic pressure. Specifically, the hydraulic pressure source 10 comprises an accumulator 10a, a pressure senor 10b, a DC motor 10c, a hydraulic pressure pump 10d and a reservoir 10e. The accumulator 10a accumulates and maintains the working fluid at a predetermined pressure. The pressure sensor 10b (also referred to as a "first hydraulic pressure sensor") detects a hydraulic pressure P1 of the working fluid accumulated in the accumulator 10a.

The reservoir 10e reserves the working fluid at the atmospheric pressure. The DC motor 10c drives and stops in accordance with an instruction from the ECU 80. When the DC motor 10c drives, the working fluid is supplied to the accumulator 10a by the hydraulic pressure pump 10d. The ECU 80 sends the instruction, depending on a detected value from the pressure sensor 10b.

A pressure governing valve 20 is constituted in a manner that the hydraulic pressure P1 of the working fluid supplied from the accumulator 10a is regulated into a hydraulic pressure P2, corresponding to stroke amount of a brake pedal (also referred to as a "brake operating member")30. More on this mechanism will be explained later. The pressure governing valve 20 comprises a valve body 20a housed in a cylinder 60, a pressure governing valve spool 20b slidingly movable in both the x1 and the x2 directions so as to seal an open end of the valve body 20a and springs 20c forcing the pressure governing valve spool 20b in the x1 direction. These springs 20c are housed in an output chamber 20f defined by an inner wall of the valve body 20a and one end of the pressure governing valve spool 20b. The output chamber 20f communicates, via a valve hole 203 formed on the valve body 20a, with hydraulic pressure passage R5 led to the auxiliary hydraulic pressure chamber 61 (described later).

The pressure governing valve 20 defines a low pressure chamber 20e with the inner wall of the valve body 20a, the inner wall of the cylinder 60 and the outer circumferential wall of pressure governing valve spool 20b by housing the valve body 20a and pressure governing valve spool 20b. The low pressure chamber 20e permanently communicates, via a hydraulic pressure R2 with the reservoir 10e and the inner pressure thereof is maintained at the atmospheric pressure. The low pressure chamber 20e further communicates with the output chamber 20f, via a valve hole 201 and a though hole 204 respectively formed on the valve body 20a.

The pressure governing valve 20 also defines a high pressure chamber 20d with the inner wall of the cylinder 60 and the outer circumferential wall of the pressure governing valve spool 20b. The high pressure chamber 20d permanently communicates, via the hydraulic pressure passage R1, with the accumulator 10a. The high pressure chamber 20d permanently maintains the hydraulic pressure P1 of the working fluid supplied from the accumulator 10a.

A supply valve 20g supplies the hydraulic pressure P1 to the output chamber 20f side. A discharge valve 20h discharges the hydraulic pressure P2 in the output chamber 20f, via the through hole 204, to the low pressure chamber 20e side.

In the cylinder 60, the auxiliary hydraulic pressure chamber 61 is defined with the inner wall of the cylinder 60, one outer end of the valve body 20a and an outer surface of a first piston 50a (described later). The auxiliary hydraulic pressure chamber 61 communicates with a hydraulic pressure passage R5 communicating with the output chamber 20f.

The master cylinder 50 comprises the first piston 50a and a second piston 50b both of which are slidingly fitted to the cylinder 60, a first master cylinder hydraulic pressure chamber 50e facing a recess portion of the first piston 50a and a second master cylinder hydraulic pressure chamber 50f facing a concave portion of the second piston 50b.

The first master cylinder hydraulic pressure chamber 50e stores springs 50c forcing the first piston 50a in the x1 direction and forcing the second piston 50b toward the x2 direction. The second master cylinder hydraulic pressure chamber 50f houses springs 50d forcing the second piston 50b toward the x1 direction.

On the first piston 50a, a communicating hole 501 is provided, which communicates with a hydraulic pressure passage R8 leading to the reservoir 10e. On the second piston 50b, a communicating hole 502 is provided, which is communicating with a hydraulic pressure passage R9 leading to the reservoir 10e. Thereby, when the brake pedal 30 is not actuated, as in a state of FIG. 1, the first master cylinder hydraulic pressure chamber 50e and the second master cylinder hydraulic pressure chamber 50f communicates with the reservoir 10e.

The first master cylinder hydraulic pressure chamber 50e communicates with a hydraulic pressure passage R4 leading to the wheel cylinders 70a, 70b for applying braking force onto two rear wheels. The second master cylinder hydraulic pressure chamber 50f communicates with a hydraulic pressure passage R6 leading to the wheel cylinders 71a, 71b for applying braking force onto two front wheels.

On a hydraulic pressure passage R5 communicating with the auxiliary hydraulic pressure chamber 61, a pressure sensor 32 (also referred to as an "output hydraulic pressure sensor") is provided. The high pressure chamber 20d of the pressure governing valve 20 communicates with the hydraulic pressure passage R3, on which an electromagnetic valve 34 (normally closed; EV 34 in FIGS. 1, 2) is provided. The low pressure chamber 20e of the pressure governing valve 20 communicates with the hydraulic pressure passage R5, via a hydraulic pressure passage R7 branching from the hydraulic pressure passage R5. An electromagnetic valve 36 (normally closed; EV 36 in FIGS. 1, 2) is provided on this hydraulic pressure passage R7.

Next, an outline of the brake control device 1 will be described with respect to a general operation thereof hereinafter.

<General Operation of the Brake Control Device 1>

First, a principal of the pressure governing valve 20 will be described.

The pressure governing valve 20 regulates the hydraulic pressure P1 in the high pressure chamber 20d into the hydraulic pressure P2, in accordance with a relation between a force in the x1 direction and a force in the x2 direction.

Specifically, the hydraulic pressure P2 is obtained by balancing a forward thrust of the pressure governing valve spool 20b in the x2 direction generated by a stroke of the brake pedal 30, and a backward thrust in the x1 direction which is {pressure of the output chamber 20f X an area of the pressure governing valve spool 20b facing the output chamber 20f+ restoring force of the springs 20c}.

Next, with reference to FIG. 2, an explanation will be given on an operation of the brake control device 1 when the brake pedal 30 is actuated.

In this case, when the pressure governing valve spool 20b moves from the position in FIG. 1 to the position in FIG. 2 in the x2 direction, the output chamber 20f is shut off from the low pressure chamber 20e, and then the output chamber 20f communicates with the high pressure chamber 20d. At this time, the pressure governing valve spool 20b is pushed toward the x2 direction by stroking the pedal 30, and pushed in the x1 direction by the hydraulic pressure P2 and the springs 20c as well.

This movement allows the discharge valve 20h to close, and then the supply valve 20g to open, so that the hydraulic pressure P1 in the high pressure chamber 20d is led, via the supply valve 20g and the through hole 204, into the output chamber 20f, where the P1 is regulated to be the hydraulic pressure P2. The regulated hydraulic pressure P2 is output, via the valve hole 203 and the hydraulic pressure passage R5, into the auxiliary hydraulic pressure chamber 61. In the second embodiment of the present invention described later, the electromagnetic valve 32 and an electromagnetic proportional valve 31 are provided on this hydraulic pressure passage R5.

In the auxiliary hydraulic pressure chamber 61, the hydraulic pressure P3 is generated by inputting the hydraulic pressure P2 from the output chamber 20f, so that the hydraulic pressure P3 pushes the first piston 50a in the x2 direction. Along with the movement of the first piston 50a, the communicating hole 501 of the first piston 50a also moves in the x2 direction, so that the communicating hole 501 is shut off from the hydraulic pressure passage R8 leading to the reservoir 10e. Then, the hydraulic pressure P4 of the first master cylinder hydraulic pressure chamber 50e is output to the wheel cylinders 70a, 70b via the hydraulic pressure passage R4. Thereby, the braking force is applied to the two rear wheels.

At the same time, the second piston 50b moves in the x2 direction, along with the movement of the first piston 50a, so that the communicating hole 502 of the second piston 50b is shut off from the hydraulic pressure passage R9 leading to the reservoir 10e. Then, the hydraulic pressure P4 of the second master cylinder hydraulic pressure 50f is output to the wheel cylinders 71a, 71b via the hydraulic pressure passage R6. Thereby, the braking force is applied to the two front wheels.

<Trouble on Pressure Governing Valve 20>

Case 1: Drop of P2 from Output Chamber 20f

An explanation will be given on how to control the brake control device 1, in the case of drop of the hydraulic pressure P2 output from the output chamber 20f due to a trouble on the pressure governing valve 20.

Assumed that a foreign substance or the like is clogged in the valve hole 203 of the valve body 20a although the hydraulic pressure P1 is output at an appropriate pressure from the accumulator 10a into the high pressure chamber 20d. In this case, a serious drop may occur in the hydraulic pressure P2 output from the output chamber 20f into the auxiliary hydraulic pressure chamber 61, which is supposed to be at an appropriate pressure, at the time of a braking operation as shown in FIG. 2. Consequently, the hydraulic pressure P2 cannot be output at the appropriate pressure in correspondence with the stroke amount of the brake pedal 30.

According to the first embodiment of the present invention, in the case where the hydraulic pressure P2 output from the pressure governing valve 20 has dropped below the predetermined pressure range, first the ECU 80 determines whether or not the hydraulic pressure P1 is output at an appropriate pressure from the accumulator 10a into the high pressure chamber 20d of the pressure governing valve 20 based on the information on pressure input from the pressure sensor 10b. Next, if the ECU 80 determines that the hydraulic pressure P2 output from the output chamber 20f has dropped lower than the predetermined range (hereinafter referred to as a "detected value") based on the information on pressure input from the pressure sensor 32 and also if the ECU 80 determines that the detected value is lower beyond a predetermined value than a current reference output hydraulic pressure based on the information on the stroke amount of the brake pedal 30, then the ECU 80 determines that a trouble has occurred on the pressure governing valve 20.

If determining the trouble on the pressure governing valve 20, then the ECU 80 sends the electromagnetic valve 34 a signal to open the valve thereof. At this time, the electromagnetic valve 36 is maintained to be closed. When the electromagnetic valve 34 opens in response to the signal, the high pressure chamber 20d is allowed to communicate with the hydraulic pressure passage R3. Thereby, the hydraulic pressure P1 at an appropriate pressure output from the accumulator 10a into the high pressure chamber 20d is output via the hydraulic pressure passages R3 and R5 into the auxiliary hydraulic pressure chamber 61. At the same time, the hydraulic pressure lower than the predetermined range is also output via the hydraulic pressure passage R5 into the auxiliary hydraulic pressure chamber 61.

Then, based on the information on pressure input from the pressure sensor 32, the ECU 80 controls open/close operations of the electromagnetic valve 34, so as to output into the auxiliary hydraulic pressure chamber 61 a pressure equal to the current reference output hydraulic pressure value depending on the information on the stroke amount of the brake pedal 30, which is input from the stroke sensor 51 based on the information on pressure input from the pressure sensor 32.

As descried above, if the hydraulic pressure P2 output from the pressure governing valve 20 becomes lower than the predetermined pressure range at the time of a braking operation, the electromagnetic valve 34 is controlled on open/close operations so as to output into the auxiliary hydraulic pressure chamber 61 a pressure equal to the current reference output hydraulic pressure value depending on the information on the stroke amount of the brake pedal 30 input from the stroke sensor 51, whereby the hydraulic pressure corresponding to the stroke amount of the brake pedal 30 can be output from the high pressure chamber 20d side into the auxiliary hydraulic pressure chamber 61 Accordingly, it is ensured to apply an appropriate braking force to each of the wheel cylinders 70a, 70b, 71a, 71b, even when a trouble occurs such that the hydraulic pressure P2 output from the pressure governing valve 20 at the time of a braking operation becomes lower than the predetermined range.

If the hydraulic pressure P2 output from the pressure governing valve 20 at the time of the braking operation becomes lower than the predetermined range, the ECU 80 may also control open/close operations of the electromagnetic valve 34 based on the information on pressure input from the pressure sensor 32, so as to output into the auxiliary hydraulic pressure chamber 61 a pressure higher than the current reference output hydraulic pressure value depending on the information on the stroke amount of the brake pedal 30 input from the stroke sensor 51. In this case, it is more ensured to apply an appropriate braking force to each of the wheel cylinders 70a, 70b, 71a, 71b, even when a trouble occurs such that the hydraulic pressure P2 output from the pressure governing valve 20 at the time of the braking operation becomes lower than the predetermined range.

Case 2: Insufficiently Reduced P2 From Output Chamber 20f

An explanation will be given, hereinafter, on how to control the brake control device 1, in the case of insufficiently reduced hydraulic pressure P2 output from the output chamber 20f.

Assumed that a trouble occurs such that movement of the pressure governing valve spool 20b is hindered because, for example, the spring or springs 20c are caught on the circumstantial wall of the output chamber 20f although the hydraulic pressure P1 is output at an appropriate pressure from the accumulator 10a into the high pressure chamber 20d of the pressure governing valve 20 at the time of the braking operation as shown in FIG. 2. In this case, it becomes impossible to output an appropriate hydraulic pressure corresponding to the stroke amount of the brake pedal 30 because the movement of the pressure governing valve spool 20b is hindered. That is, even if the stroke of brake pedal 30 is eased, a return of the pressure governing valve spool 20b becomes insufficient, so that a sufficiently reduced hydraulic pressure from the output chamber 20f into the auxiliary hydraulic pressure chamber 61 cannot be obtained. Consequently, it becomes impossible to output the hydraulic pressure P2 at an appropriate pressure corresponding to the stroke amount of the brake pedal 30.

According to the first embodiment of the present invention, the ECU 80 determines that a trouble occurs on the hydraulic pressure P2 output from the output chamber 20f if it is determined that a value of the hydraulic pressure P2 from the output chamber 20f becomes higher beyond a predetermined value than the current output reference value depending on the information on the stroke amount of the brake pedal 30 input from the stroke sensor 51, based on the information on pressure input from the pressure sensor 32.

If determining that a trouble of insufficiently reduced hydraulic pressure occurs on the pressure governing valve 20 as described above, then the ECU 80 sends a signal to the electromagnetic valve 36 to open the valve thereof. At this time, the electromagnetic valve 34 is maintained to be closed. When the electromagnetic valve 36 opens in response to the signal, the high pressure chamber 20d is allowed to communicate, via the hydraulic pressure passage R5, R7 branching from the hydraulic pressure passage R5, the low pressure chamber 20e and the hydraulic pressure passage R2, with the reservoir 10e. Thereby a part of the hydraulic pressure output from the output chamber 20f to the hydraulic pressure passage R5 is released into the reservoir 10e, via the hydraulic pressure passage R5, R7 branching from the hydraulic pressure passage R5, the low pressure chamber 20e and the hydraulic pressure passage R2. Accordingly, it becomes possible to reduce the hydraulic pressure in the output chamber 20f.

The ECU 80 controls open/close operations of the electromagnetic valve 36 so as to output into the auxiliary hydraulic pressure chamber 61 a hydraulic pressure equal to the current reference output hydraulic pressure value depending on the information on the stroke amount of the brake pedal 30 input from the stroke sensor 51. Thereby, a part of the hydraulic pressure output from the output chamber 20f to the hydraulic pressure passage R5 is discharged, via the hydraulic pressure R7 side, into the reservoir 10e. Accordingly, the trouble that the hydraulic pressure in the output chamber 20f is insufficiently reduced can be solved.

As explained above, if a trouble of insufficiently reduced hydraulic pressure occurs on the pressure governing valve 20, the ECU 80 controls open/close operations of the electromagnetic valve 36, so as to output into the auxiliary hydraulic pressure chamber 61 a pressure equal to the current reference output hydraulic pressure value depending on the information on the stroke amount of the brake pedal 30 input from the stroke sensor 51. Thereby, the trouble that the hydraulic pressure is insufficiently reduced can be solved, and an appropriate hydraulic pressure corresponding to the stroke amount of the brake pedal 30 can be output into the auxiliary hydraulic pressure chamber 61. Accordingly, it is ensured to apply an appropriate braking force to each of the wheel cylinder 70a, 70b, 71a, 71b, even when the trouble of the insufficiently reduced hydraulic pressure occurs on the pressure governing valve 20 at the time of the braking operation.

The ECU 80 may also control open/close operations of the electromagnetic valve 36 so as to output into the auxiliary hydraulic pressure chamber 61 a pressure lower than the current reference output hydraulic pressure value depending on the information on the stroke amount of the brake pedal 30 input from the stroke sensor 51. In this case, it is possible to weaken influences caused by the insufficiently reduced hydraulic pressure in the pressure governing valve 20, and to output the hydraulic pressure corresponding to the stroke amount of the brake pedal 30 into the auxiliary hydraulic pressure chamber 61.

Second Embodiment

The second embodiment of the present invention will be descried hereinafter, with reference to FIGS. 3 and 4.

The brake control device 100 principally comprises a hydraulic pressure source 10, a pressure governing valve 20, an auxiliary hydraulic pressure chamber 61, a master cylinder 50, wheel cylinders 70a, 70b, 71a, 71b and ECU 80, mostly similar to the brake control device 1 in the first embodiment.

With reference to FIG. 3, a detailed description will be given on the brake control device 100.

<Components>

Each component of the brake control device 100 according to the second embodiment is approximately the same as that of the brake control device 1 in the first embodiment, except for the electromagnetic valve 34, an electromagnetic valve 32, electromagnetic proportional valves 31, 33, pressure sensors 40, 41 for detecting each hydraulic pressure in an output chamber 20f and in an auxiliary hydraulic pressure chamber 61. Therefore, a specific description will be given only on these different components. The similar components are supposed to be seen in <Components> of the first embodiment, as shown in FIG. 1.

First, a description will be given on the electromagnetic valves 34, 32 and the electromagnetic proportional valves 31, 33.

The electromagnetic valve 32 normally open (also referred to as "a second valve" and EV 32 in FIG. 3) and the electromagnetic proportional valve 31 normally open (also referred to as a "first proportional valve" and EPV 31 in FIG. 3) are provided on the hydraulic pressure passage R5. A check valve 32a is provided in parallel to the electromagnetic valve 32 so as to allow only a flow from upstream to downstream, and a check valve 31a is also provided in parallel to the electromagnetic proportional valve 31 so as to allow only a flow from downstream to upstream.

The hydraulic pressure R5 branches from the hydraulic pressure R3 leading to the high pressure chamber 20d on the downstream side of the electromagnetic proportional valve 31. The electromagnetic valve 34 normally closed (also referred to as a "first valve" and EV 34 in FIG. 3) is provided on this hydraulic pressure R3. In the second embodiment, these two electromagnetic valves 32, 34 have an automatic brake control function, and hereinafter the electromagnetic valves 32, 34 including this automatic brake control function (described later) are referred to as an automated brake control switching valve unit.

The hydraulic pressure R7 branches from the hydraulic pressure R5 leading to the low pressure chamber 20e on the downstream side of the electromagnetic proportional valve 31. The electromagnetic proportional valve 33 normally closed (also referred to as a "second proportional valve", and EPV 33 in FIG. 3) is provided on this hydraulic pressure R7.

In the second embodiment, these two electromagnetic proportional valves 31, 33 have a regenerative cooperative brake control function (described later), and hereinafter the valves 31, 33 including this regenerative cooperative brake control function are referred to as an regenerative cooperative control switching valve unit. Note that the electromagnetic proportional valves 31, 33 can also be used as electromagnetic valves by providing a duty control thereon.

An explanation will be given on the pressure sensors 40, 41 for detecting pressures in the output chamber 20f and in the auxiliary hydraulic pressure chamber 61, respectively.

The pressure sensor 40 (also referred to as a "first output hydraulic pressure sensor") and the pressure sensor 41 (also referred to as a "a second hydraulic pressure sensor") are configured in a manner that the pressure sensor 40 detects the hydraulic pressure P2 in the output chamber 20f and the pressure sensor 41 detects the hydraulic pressure P3 in the auxiliary hydraulic pressure chamber 61, respectively. Each of the pressure sensors 40, 41 outputs its detected value to the ECU 80.

The stroke sensor 51 detects the stroke amount of the brake pedal 30 and outputs the detected value thereof to the ECU 80.

The ECU 80 has not only a general function such as giving a drive instruction to the DC motor 10c, but also functions as a reference pressure deciding part 80a, a trouble determining part 80b and a control part 80c. The functions of these parts 80a to 80c will be described later.

<General Operation of the Brake Control Device 100>

Since the general operation of the brake control device 100 in the second embodiment is the same as that of the second embodiment, a description thereon will be omitted in this embodiment (see <General Operation of the Brake Control Device 1> in the first embodiment).

<Trouble on Pressure Governing Valve 20>

Case 1: Drop of P2 From Output Chamber 20f

An explanation will be given on how to control the brake control device 100, in the case of drop of the hydraulic pressure P2 output from the output chamber 20f due to, for example, a clog in the pressure governing valve 20.

In order to solve the drop of the P2 output from the output chamber 20f due to the above reason, the ECU 80 controls the electromagnetic valve 32 to close and the electromagnetic valve 34 to open. This control allows the P1 in the high pressure chamber 20d to be supplied from the electromagnetic valve 34, via the hydraulic pressure passages R3 and R5, into the auxiliary hydraulic pressure chamber 61. In order to maintain this increased P3, both the electromagnetic valves 32 and 34 may be controlled to close.

Case 2: Insufficiently Reduced P2 From Output Chamber 20f

An explanation will be given on how to control the brake control device 100, in the case that insufficiently reduction occurs in hydraulic pressure P2 outputted from the output chamber 20f. This trouble occurs because, for example, the spring or springs 20c happen to be caught onto the circumferential wall of the output chamber 20f, hindering the pressure governing valve spool 20b from moving smoothly.

In order to solve this insufficiently reduced hydraulic pressure P3 in the auxiliary hydraulic pressure chamber 61 due to the above reason, the ECU 80 controls the electromagnetic valve 32 to open and the electromagnetic valve 34 to close.

This control allows the hydraulic pressure P3 in the auxiliary hydraulic pressure chamber 61 to be led, via the electromagnetic valve 32, into the output chamber 20f, and then through the discharge valve 20h to the low pressure chamber 20e side, so that the hydraulic pressure P3 in the auxiliary hydraulic pressure chamber 61 is reduced.

If the brake pedal 30 is stroked during the automatic brake control operation, the hydraulic pressure P2 outputted from the pressure governing valve 20 exceeds the hydraulic pressure P3 in the auxiliary hydraulic pressure chamber 61 on the automatic brake control operation, so that a further pressure is applied to the hydraulic pressure P3, via the check valve 32a a parallel to the electromagnetic valve 32.

<Regenerative Cooperative Control Function>

An explanation will be given on the regenerative cooperative control function by using the electromagnetic proportional valves 31, 33.

During operating the regenerative cooperative control function, the ECU 80 provides a control as below, in order to distribute a required braking force caused by a stroke of the brake pedal 30 into a regenerative braking force and a friction (hydraulic pressure) braking force, for example, in an electric vehicle.

In this function, for example, the ECU 80 controls the electromagnetic proportional valve 31 to close, and controls the electromagnetic proportional valve 33 to open, whereby the hydraulic pressure P3 in the hydraulic pressure chamber 61 is discharged via the electromagnetic proportional valve 33 into the low pressure chamber 20e side. Therefore, the hydraulic pressure P3 in the auxiliary hydraulic pressure chamber 61 is reduced, thus making it possible to regulate the distribution of the friction braking force corresponding to the proportion of the regenerative braking force at a desired proportion.

Note that, if performing a regenerative brake control at an initial stage of stroking the brake pedal 30, a hydraulic pressure flowing from the output chamber 20f into the auxiliary hydraulic pressure chamber 61 may be shut off or reduced by controlling the electromagnetic proportional valve 31. This means that, if the stroke amount of the brake pedal 30 is reduced during the regenerative brake control operation, and the hydraulic pressure P2 output from the pressure governing valve 20 becomes lower than the hydraulic pressure P3 of the auxiliary hydraulic pressure chamber 61 during the regenerative brake control operation, then the hydraulic pressure P3 is reduced via the check valve 31a provided in parallel to the electromagnetic proportional valve 31.

Next, a typical performance of the ECU 80 of the brake control device 100 will be explained.

Figure 4:
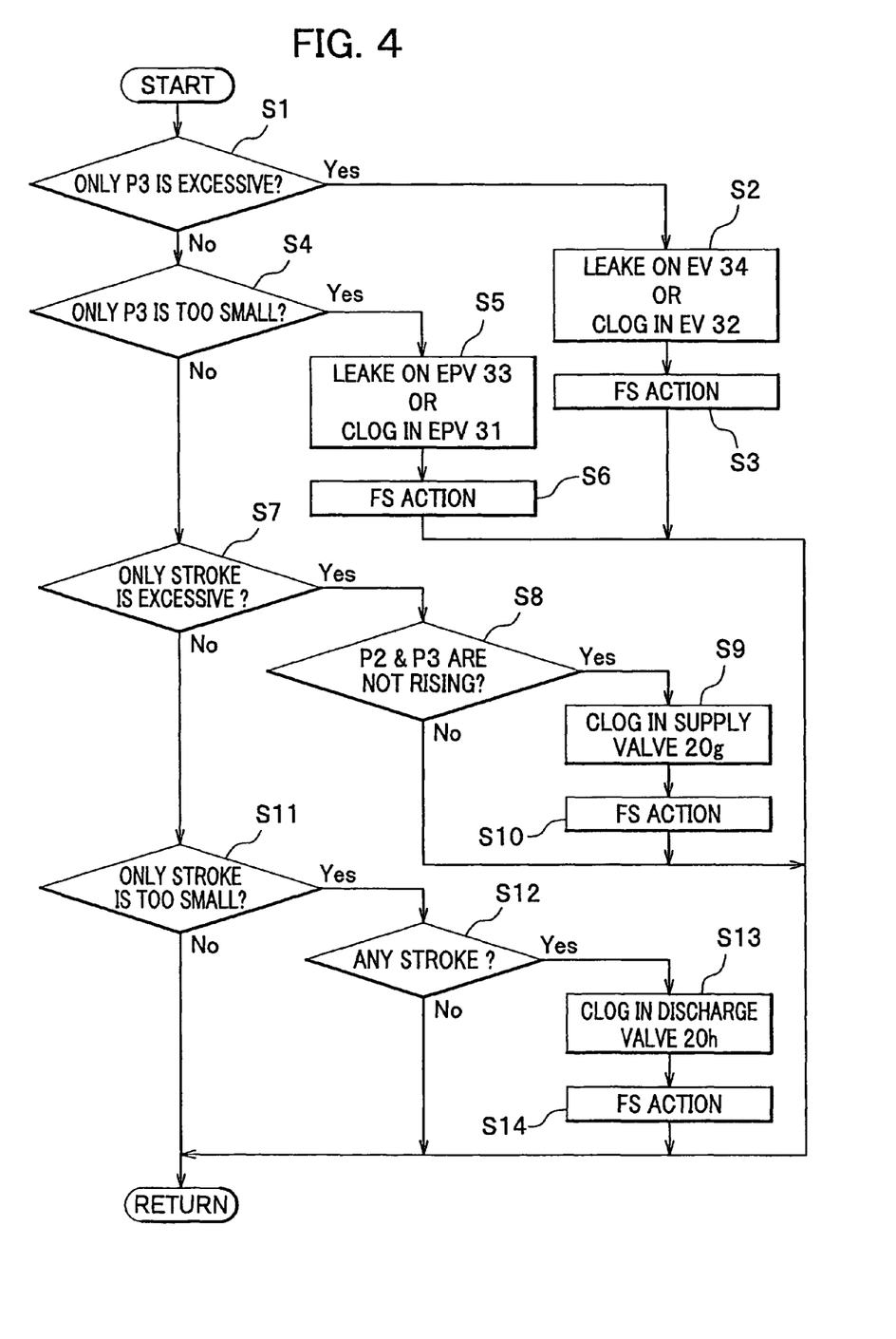
FIG. 4 is a flow chart explaining steps of a process carried by ECU shown in FIG. 3.

FIG. 4 shows a series of processing steps of the ECU 80. An explanation will be given in the case that appropriate detected values are input to the ECU 80 from the pressure sensors 40, 41 and the stroke sensor 51.

To be more detailed, the ECU 80 receives a detected value of the hydraulic pressure P2 in the output chamber 20f and a detected value of the hydraulic pressure P3 in the auxiliary hydraulic pressure chamber 61. The ECU 80 also receives a detected value indicating stroke amount of the brake pedal 30 as an operational amount of the brake pedal 30.

Then, the reference pressure deciding part 80a of the ECU 80 decides a reference pressure value depending on the detected values from the stroke sensor 51. This decision is made depending on a relation between a predetermined detected value and a hydraulic pressure from the output chamber 20f in a condition in which the hydraulic pressure source 10 works normally and an appropriate hydraulic pressure is accumulated in the accumulator 10a.

In this case, the trouble determining part 80b of the ECU 80 determines whether or not only the hydraulic pressure P3 is excessive, in the light of a correlation of the hydraulic pressure P2 indicated in a detected value from the pressure sensor 40, the hydraulic pressure P3 indicated in a detected value from the pressure sensor 41 and the reference pressure (S1).

"Only the hydraulic pressure P3 is excessive" herein donates that the hydraulic pressure P2 and the reference pressure are approximately equal and the hydraulic pressure P3 is greater than these two values.

A determination on whether or not "the P2 and the reference pressure are approximately equal" or "P3 is greater than them" may be made by using a threshold. For example, if a difference between the P2 and the reference pressure is smaller than the threshold, the determination falls within "the P2 and the reference pressure are approximately equal". If both a difference between the P2 and the P3, and a difference between the reference pressure and P3 are equal or greater than the threshold, the determination falls within "P3 is greater than these two values".

If the determination is "only P3 is excessive" (Yes at S1), the trouble determining part 80b determines that the trouble is a leak on the electromagnetic valve 34 or a clog in the electromagnetic valve 32 (S2), and then proceeds to S3.

At S3, the control part 80c of the ECU 80 performs a FS action to reduce the hydraulic pressure P3 by controlling the electromagnetic proportional valve 33. Note that FS is an abbreviation for "Failsafe". That is, the electromagnetic proportional valve 33 is controlled to open the valve thereof. Thereby, the working fluid in the auxiliary hydraulic pressure chamber 61 is discharged, via the electromagnetic proportional valve 33, the low pressure chamber 20e into the reservoir 10e, so that the hydraulic pressure P3 in the auxiliary hydraulic pressure chamber 61 is reduced.

On the other hand, if the ECU 80 determines, at S1, that only the P3 is not excessive (No at S1), the trouble determining part 80b determines whether or not only the P3 is too small in the light of the relation with the above the P2, the P3 and the reference pressure. "Only the P3 is too small" herein donates that the hydraulic pressure the P2 and the reference pressure are approximately equal and the hydraulic pressure P3 is smaller than these two values.

A determination on whether or not "the P2 and the reference pressure are approximately equal" is the same as at S1, and a determine on whether or not "the P3 is smaller than them" is determined by use of the threshold. For example, if both a difference between the P2 and the P3, and a difference between the reference pressure and the P3 are less than the threshold falls within "the P3 is smaller than these two value."

If the determination is "only the P3 is too small" (Yes at S4), the trouble determining part 80b determines that the trouble is a leak on the electromagnetic proportion valve 33 or a clog in the electromagnetic proportion valve 31 (S5), and then proceeds to S6.

At S6, the trouble determining part 80b performs a FS action to apply a further pressure to the hydraulic pressure P3 by controlling the electromagnetic valve 34. Specifically, the electromagnetic valve 34 is controlled to open the valve thereof, whereby the working fluid in the high pressure chamber 20d is supplied via the electromagnetic valve 34 into the auxiliary hydraulic pressure chamber 61, so that a further pressure is applied to the hydraulic pressure P3 in the auxiliary hydraulic pressure chamber 61.

On the other hand, on the determination at S4, if it is determined that only P3 is not too small (No at S4), then the trouble determining part 80b proceeds to S7 so as to determine whether or not only the reference pressure is excessive, that is, only the stroke of the brake pedal 30 is excessive in the light of the correlation of the above three. "Only the reference pressure is excessive" herein donates that the P2 and the P3 are approximately equal and the reference pressure is greater than these two values. In this case, this determination may be made by use of the threshold.

If the determination is "only the stoke of the brake pedal 30 is excessive" (Yes at S7), the trouble determining part 80b proceeds to S8 so as to determine whether or not the P2 and the P3 are in a condition in which they are not rising. If the trouble determining part 80b determines that they are not rising (Yes at S8), then it proceeds to S9.

At S9, the trouble determining part 80b determines that the trouble is a clog in the supply valve 20g, then proceeding to S10.

At S10, the control part 80c performs the FS action to apply a further pressure to the hydraulic pressure P3 by controlling the electromagnetic valve 34. Specifically, the electromagnetic valve 34 is controlled to open the valve thereof, so that the working fluid in the high pressure chamber 20d is supplied via the electromagnetic valve 34 into the auxiliary hydraulic pressure chamber 61. Accordingly, a further pressure is applied to the hydraulic pressure P3 in the auxiliary hydraulic pressure chamber 61.

On the other hand, on the determination at S7, if it is determined that only the stroke of the brake pedal 30 is not excessive (No at S7), the trouble determining part 80b proceeds to S11 so as to determine whether or not only the stroke of the brake pedal 30 is too small in the light of the correlation of the above three. "Only the stroke of the brake pedal 30 is not too small" herein donates that the P2 and the P3 are approximately equal and the reference pressure is smaller than these two values. In this case, this determination may be made by use of the threshold.

If the determination is "only the stroke of the brake pedal 30 is too small" (Yes at S11), the trouble determining part 80b proceeds to S12 and determines whether or not there is any stroke (any change to reduction). At this step, the trouble determining part 80b determines that there is any stroke if the detected value on the stroke sensor 51 is not "0".

If the determination is "there is any stroke" (Yes at S12), the trouble determining part 80b proceeds to S13 and determines that the trouble is a clog in the discharge valve 20h, then proceeding to S14.

At S14, the trouble determining part 80b of the ECU 80 performs the FS action to reduce the hydraulic pressure P3 by controlling the electromagnetic proportional valve 33 to open the valve thereof. Thereby, the working fluid in the auxiliary hydraulic pressure chamber 61 is discharged via the electromagnetic valve 33 to the low pressure chamber 20e side, so that the hydraulic pressure P3 in the auxiliary hydraulic pressure chamber 61 is reduced.

For example, if the determination is "only the P2 is excessive" in the light of the correlation of the above three, the trouble determining part 80b determines that there occurs a trouble on the pressure sensor 40.

As described above, the ECU 80 diagnoses a possibility of a trouble on the pressure governing valve 20 such as the supply valve 20g, the electromagnetic valves 32, 34 or the electromagnetic proportional valves 31, 33, and performs an appropriate action for the trouble by providing the FS action, according to the diagnosis result.

Note that the present invention is not limited to the above-described specific embodiments, and various modifications can be made on the structure of the brake control devices according to the embodiments of the present invention without departing from the scope and the purport of the invention as defined in the appended Claims. For example, although the above explanation shows an example in which the master cylinder 50 is equipped, the hydraulic pressure P2 may be directly applied to each wheel cylinder 70a, 70b, 71a, 71b, without using the master cylinder 50.

A sensor for detecting a footing force on the brake pedal 30 can be provided along with the stroke sensor 51.

When determining a trouble at S2, S5, S9 or S13, the trouble determining part 80b mat also output this result to a remote display device (not shown in the drawings). This allows a driver to check a possibility of a boost function failure or the like. The stroke sensor 51 may have a dual function to perform a self-diagnosis to determine itself whether it is "normal" or "abnormal". In this case, S8 and S12 may be omitted.

The automatic brake control function can increase the hydraulic pressure P3 of the wheel cylinder side (the auxiliary hydraulic pressure chamber 61) by applying a further pressure to the hydraulic pressure P2 output from the pressure governing valve 20. Therefore, this function may be used for a control for booting a multiplying ratio which is normally fixed by the structure of the pressure governing valve 20, or for a brake assist control when hitting the brake pedal 30.

The brake control devices according to the embodiment of the present invention have been described a s an example in which they are quipped on a vehicle, but they may also be equipped on other moving objects such as an air plane.

If a trouble occurs on a pressure governing valve, the present invention provides a precise diagnosis on the trouble condition so as to perform an appropriate action for the trouble. Therefore, even if an output hydraulic pressure from the pressure governing valve becomes lower than the predetermined range at the time of a braking operation, or even if the output hydraulic pressure from the pressure governing valve cannot be sufficiently reduced, an appropriate output hydraulic pressure can be output corresponding to the stroke amount of a brake pedal.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

Then, based on the information on pressure input from the pressure sensor 32, the ECU 80 controls open/close operations of the electromagnetic valve 34, so as to output into the auxiliary hydraulic pressure chamber 61 a pressure equal to the current reference output hydraulic pressure value depending on the information on the stroke amount of the brake pedal 30, which is input from the stroke sensor 51 based on the information on pressure input from the pressure sensor 32.

What is claimed is:

1. A brake control device comprising:
   a hydraulic pressure source comprising a pump for pumping working fluid from a reservoir and an accumulator for accumulating the working fluid pumped by the pump;
   a pressure governing valve for regulating and outputting hydraulic pressure supplied from the accumulator corresponding to a stroke amount of a brake operating member;
   a plurality of wheel cylinders operated by the output hydraulic pressure outputted from the pressure governing valve;
   an electromagnetic valve that is normally closed and is provided on a hydraulic pressure passage and directly communicated with a low pressure chamber of the pressure governing valve, thereby to allow the reservoir to communicate with a hydraulic pressure passage when the electromagnetic valve is opened, allowing a hydraulic pressure output side of the pressure governing valve to communicate with the wheel cylinders;

a first hydraulic pressure sensor for detecting a value of the hydraulic pressure supplied from the accumulator into the pressure governing valve;

an output hydraulic pressure sensor for detecting a value of the output hydraulic pressure outputted from a hydraulic pressure output side of the pressure governing valve into the wheel cylinders;

a stroke amount detecting part for detecting a stroke amount of the brake operating member; and a control unit for controlling the electromagnetic valve to open and close, depending on information detected from the first hydraulic pressure sensor, the output hydraulic pressure sensor and the stroke amount detecting part, wherein the control unit selectively controls the electromagnetic valve to open so as to output a part of the output hydraulic pressure outputted from the hydraulic pressure input side of the pressure governing valve via the hydraulic pressure passage on which the electromagnetic valve is provided and the low pressure chamber of the pressure governing valve into the reservoir when determining that a trouble has occurred on the pressure governing valve, wherein the control unit determines the trouble on the pressure governing valve if determining that:

the hydraulic pressure within a defined range is outputted from the accumulator to the hydraulic pressure input side of the pressure governing valve, based on information on the detected value inputted from the first hydraulic pressure sensor;

a value of the output hydraulic pressure outputted from the hydraulic pressure output side of the pressure governing valve at a time of a braking operation by the brake operating member is higher than a reference output pressure depending on information on the stroke amount of the braking operation inputted from the stroke amount detecting part, based on information on the detected value inputted from the output hydraulic pressure sensor; and a difference between the value of the output hydraulic pressure and the reference output pressure is greater than a predetermined value;

thereby to generate a master cylinder pressure in accordance with the reference output pressure.

2. The brake control device according to claim 1, wherein the control unit controls the electromagnetic valve to open and close, so as to output a hydraulic pressure equal to a value of the reference output pressure value into the wheel cylinders when determining that the trouble occurs on the pressure governing valve.

3. The brake control device according to claim 1, wherein the control unit controls the electromagnetic valve to open and close, so as to output a hydraulic pressure lower than a value of the reference output pressure into the wheel cylinders when the trouble occurs on the pressure governing valve.

4. A brake control device comprising:

a hydraulic pressure source comprising a pump for pumping working fluid from a reservoir and an accumulator for accumulating the working fluid pumped by the pump;

a pressure governing valve for regulating and outputting hydraulic pressure supplied from the accumulator corresponding to a stroke amount of a brake operating member;

a plurality of wheel cylinders operated by the output hydraulic pressure outputted from the pressure governing valve;

an electromagnetic valve that is normally closed and is provided on a hydraulic pressure passage and directly communicated with a high pressure chamber of the pressure governing valve, thereby to allow an accumulator side to communicate with the wheel cylinders when the electromagnetic valve is opened, via a hydraulic pressure input side of the pressure governing valve;

a first hydraulic pressure sensor for detecting a value of the hydraulic pressure supplied from the accumulator into the pressure governing valve;

a housing in which the pressure governing valve is slidably fitted; a master cylinder piston which is slidably fitted forward of the pressure governing valve in the housing, wherein the master cylinder piston is moved by virtue of fluid pressure outputted from the pressure governing valve so as to generate master cylinder pressure;

an output hydraulic pressure sensor for detecting a value of the output hydraulic pressure outputted from a hydraulic pressure output side of the pressure governing valve to the wheel cylinders;

a stroke amount detecting part for detecting a stroke amount of the brake operating member; and a control unit for controlling the electromagnetic valve to open and close, depending on information from the first hydraulic pressure sensor, the output hydraulic pressure sensor and the stroke amount detecting part, wherein the control unit controls the electromagnetic valve to open so as to output the hydraulic pressure outputted from the accumulator side via the hydraulic pressure input side and the high pressure chamber of the pressure governing valve into the wheel cylinders when determining that a trouble has occurred at the pressure governing valve, wherein the control unit determines the trouble on the pressure governing valve if determining that:

the hydraulic pressure within a defined range is outputted from the accumulator to the hydraulic pressure input side of the pressure governing valve, based on information on the detected value inputted from the first hydraulic pressure sensor;

a value of output hydraulic pressure outputted from the hydraulic pressure output side of the pressure governing valve at a time of a braking operation by the brake operating member is lower than a reference output pressure depending on information on the stroke amount of the braking operation inputted from the stroke amount detecting part, based on information on the detected value inputted from the output hydraulic pressure sensor; and a difference between the value of the output hydraulic pressure and the reference output pressure is greater than a predetermined value;

thereby to generate a master cylinder pressure in accordance with the reference output pressure, and wherein the control unit controls the electromagnetic valve to open and close, so as to output a hydraulic pressure equal to a value of the reference output pressure into the wheel cylinders when determining that the trouble occurs on the pressure governing valve.

5. A brake control device comprising:

a hydraulic pressure source comprising a pump for pumping working fluid from a reservoir and an accumulator for accumulating the working fluid pumped by the pump;

a pressure governing valve for regulating and outputting hydraulic pressure supplied from the accumulator corresponding to a stroke amount of a brake operating member;

a plurality of wheel cylinders operated by the output hydraulic pressure outputted from the pressure governing valve;

an electromagnetic valve that is normally closed and is provided on a hydraulic pressure passage and directly communicated with a high pressure chamber of the pressure governing valve, thereby to allow an accumulator side to communicate with the wheel cylinders when the electromagnetic valve is opened, via a hydraulic pressure input side of the pressure governing valve;

a first hydraulic pressure sensor for detecting a value of the hydraulic pressure supplied from the accumulator into the pressure governing valve;

a housing in which the pressure governing valve is slidably fitted; a master cylinder piston which is slidably fitted forward of the pressure governing valve in the housing, wherein the master cylinder piston is moved by virtue of fluid pressure outputted from the pressure governing valve so as to generate master cylinder pressure;

an output hydraulic pressure sensor for detecting a value of the output hydraulic pressure outputted from a hydraulic pressure output side of the pressure governing valve to the wheel cylinders;

a stroke amount detecting part for detecting a stroke amount of the brake operating member; and a control unit for controlling the electromagnetic valve to open and close, depending on information from the first hydraulic pressure sensor, the output hydraulic pressure sensor and the stroke amount detecting part, wherein the control unit controls the electromagnetic valve to open so as to output the hydraulic pressure outputted from the accumulator side via the hydraulic pressure input side and the high pressure chamber of the pressure governing valve into the wheel cylinders when determining that a trouble has occurred at the pressure governing valve, wherein the control unit determines the trouble on the pressure governing valve if determining that:

the hydraulic pressure within a defined range is outputted from the accumulator to the hydraulic pressure input side of the pressure governing valve, based on information on the detected value inputted from the first hydraulic pressure sensor;

a value of output hydraulic pressure outputted from the hydraulic pressure output side of the pressure governing valve at a time of a braking operation by the brake operating member is lower than a reference output pressure depending on information on the stroke amount of the braking operation inputted from the stroke amount detecting part, based on information on the detected value inputted from the output hydraulic pressure sensor; and a difference between the value of the output hydraulic pressure and the reference output pressure is greater than a predetermined value;

thereby to generate a master cylinder pressure in accordance with the reference output pressure, and wherein the control unit controls the electromagnetic valve to open and close, so as to output a hydraulic pressure higher than a value of the reference output pressure into the wheel cylinders when determining that the trouble occurs on the pressure governing valve.

* * * * *